UNITED STATES PATENT OFFICE.

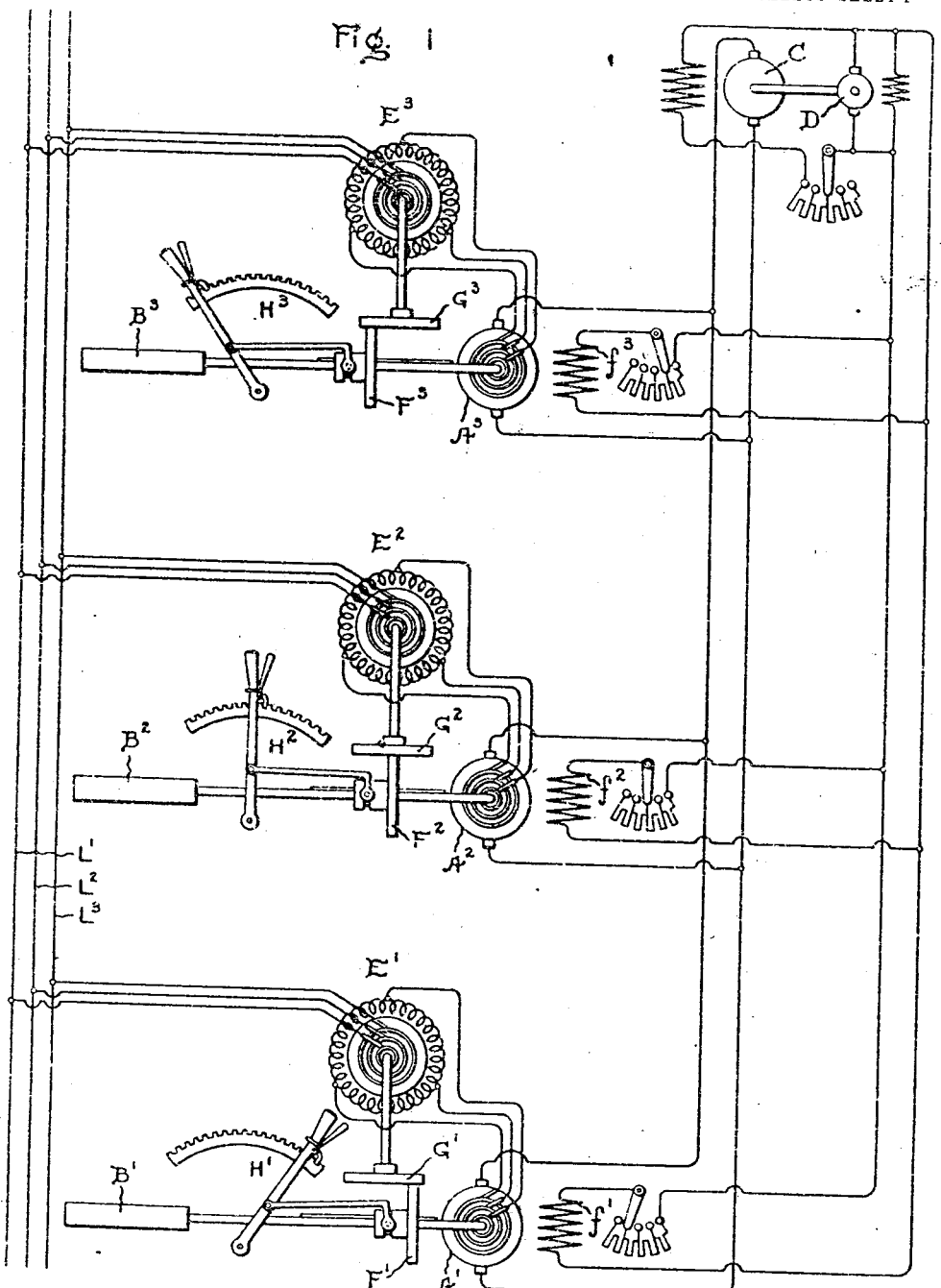

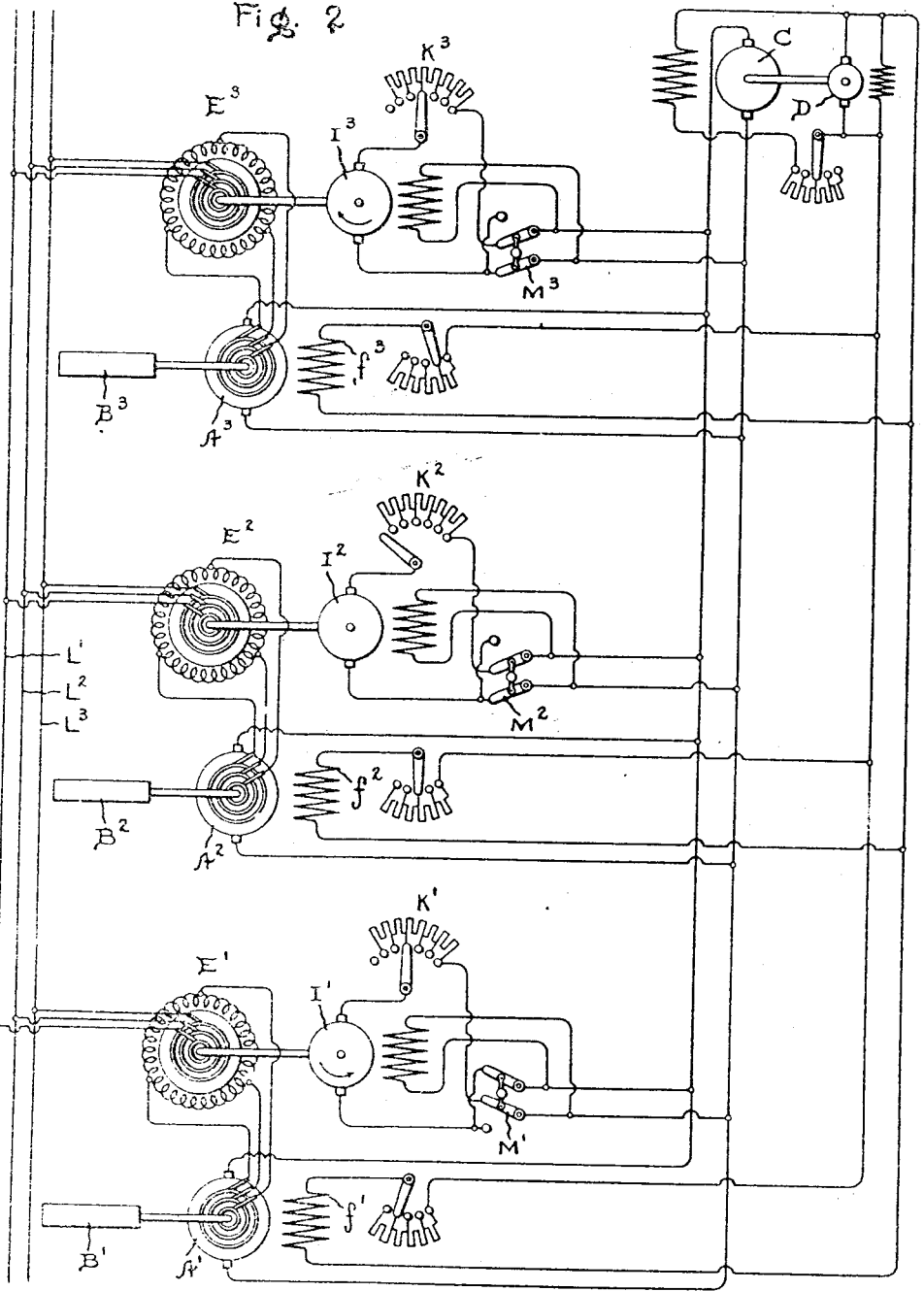

CHARLES C. BATCHELDER, OF SCHENECTADY, NEW YORK, ASSIGNOR TO GENERAL ELECTRIC COMPANY, A CORPORATION OF NEW YORK.

ELECTRIC-MOTOR DRIVE.

1,075,683.   Specification of Letters Patent.   Patented Oct. 14, 1913.

Application filed June 23, 1909. Serial No. 503,790.

*To all whom it may concern:*

Be it known that I, CHARLES C. BATCHELDER, a citizen of the United States, residing at Schenectady, county of Schenectady, State of New York, have invented certain new and useful Improvements in Electric-Motor Drives, of which the following is a specification.

My invention relates to electric motor drives and more particularly to such drives for machines composed of parts each of which must be driven at a slightly different speed from another part, the different speeds bearing a fixed relation to each other, as for instance paper making machines.

In paper making machines, the raw material or pulp is supplied to what is known as the "wet end" of the machine, where it is collected by devices into a thin sheet, which is in a moistened state. This thin sheet is then conveyed to the succeeding parts of the machine which drives the moisture out of the pulp and forms it into paper. It will thus be seen that it is necessary to drive all parts of the machine at the proper speed to prevent the sheet from breaking or sagging between the various parts. As the paper passes through the different sections of the machine, it stretches or contracts in the different parts of the machine according to the grade of paper, and consequently each part of the machine must be driven at a slightly different speed from another part, and when the machine is once adjusted, the speeds of the different parts must bear a fixed relation to each other. In order to accomplish this, I provide each part of the machine with a separate electric motor, and frequency changers connected between the several motors and alternating current busses, the speed of the several frequency changers being independently adjustable.

For a better understanding of my invention reference may be had to the following description taken in connection with the accompanying drawings in which—

Figure 1 shows diagrammatically a paper machine provided with an electric drive in accordance with my invention and in which the revolving members of the frequency changers are driven by the motors driving the separate parts of the paper machine, and Fig. 2 shows a modified embodiment of my invention in which the revolving members of the frequency changers have independent motors for driving them.

Referring to the drawings, $A^1$, $A^2$ and $A^3$ are the armatures of the motors driving the various parts, $B^1$, $B^2$ and $B^3$ of a machine, each at a slightly different speed from another. These motors are shown as being of the direct-current type with alternating-current connections, which, in a revolving armature machine as shown, comprise collector rings tapped to suitable points of the armature winding. The speed of the machine as a whole, that is, the speed of all the motors may be controlled in any suitable manner, as for example, by the well known "Ward Leonard" system in which the speed of the motors is controlled by varying the value of the electromotive force of the generator C, supplying the armatures of the motors $A^1$, $A^2$ and $A^3$. The field windings $f^1$, $f^2$ and $f^3$ of the motors are separately excited by the generator D, which also supplies the excitation for generator C. The induction frequency changers $E^1$, $E^2$ and $E^3$ are connected between the motors, and the alternating-current busses $L^1$, $L^2$ and $L^3$. As shown, the collector rings of the armatures $A^1$, $A^2$ and $A^3$ are connected to the stationary members of the frequency changers, the revolving members being connected to the busses $L^1$, $L^2$ and $L^3$.

In Fig. 1, the revolving member of each frequency changer is driven from its corresponding motor by means of a variable speed mechanism of any suitable design. As shown in the drawing the variable speed mechanisms consist of the disks $F^1$, $F^2$ and $F^3$ mounted on the shafts of the armatures $A^1$, $A^2$ and $A^3$ respectively, which disks frictionally engage the disks $G^1$, $G^2$ and $G^3$ mounted on the shafts of the revolving members of the frequency changers. The relative speeds of the different revolving members of the frequency changers may be changed by shifting the disks $F^1$, $F^2$ and $F^3$ along the armature shafts by means of the shifting mechanisms $H^1$, $H^2$ and $H^3$. As shown in this figure of the drawings, the disks $F^1$ and $G^1$ engage each other in such a manner that the revolving member of the frequency changer $E^1$ rotates in one direction, while the disks $F^3$ and $G^3$ engage so as to drive the revolving member of the frequency changer E³ in the opposite direction, and the disks F² and G² engage so that the revolving member of the frequency changer E² has no tendency to rotate in either direction.

In the modification shown in Fig. 2, the revolving members of the frequency changers are driven by motors I¹, I² and I³, which are supplied with current from the generator C. The relative speeds of the different revolving members may be changed by means of rheostats K¹, K² and K³ in series with the armatures of the motors I¹, I² and I³ and the reversing switches M¹, M² and M³. As shown in this figure of the drawings, the reversing switch M¹ is in a position such that the motor I¹ runs in one direction, while the reversing switch M³ is in a position such that the motor I³ runs in the opposite direction, and motor I² is open-circuited at the rheostat K², so that it is stationary.

The frequency changers are held stationary when the speed changing mechanism in Fig. 1 is in the position in which there is no tendency to revolve the frequency changers, or the motors for driving the revolving members of the frequency changers in Fig. 2 are open-circuited. If the rotatable member of an induction frequency changer is held stationary, the frequency of the current in both members is the same, and the frequency changer will operate as a stationary transformer. If the rotatable member has impressed upon it a voltage of a definite frequency and is revolved in a backward direction, that is, against the mechanical force acting between the members, the frequency in the stationary member is equal to the sum of the frequency of rotation of the revolving member and the impressed frequency on the revolving member, while if it is revolved in a forward direction the frequency in the stationary member is equal to the difference between the impressed frequency and the frequency of rotation.

It is well known that if direct-current motors are supplied with collector rings, which are connected together either directly or through stationary transformers to busses, the motors will be compelled to run in synchronism, as is clearly explained in the patent to Thomson and Rice, 545,111, dated August 27, 1895. If all the rotatable members of the frequency changers are held stationary, they act as stationary transformers, so that all the armatures A¹, A², and A³ are held in synchronism. If the disk F¹ is shifted so as to engage the disk G¹ as shown in Fig. 1 and the reversing switch M¹ and rheostat K¹ are adjusted so as to rotate the motor I¹ as shown in Fig. 2, that is, so that the rotatable member of frequency changer E¹ is rotated backward, a frequency is produced in the stationary member slightly greater than the frequency of the current in the busses L¹, L² and L³. Since the stationary member of frequency changer E¹ is connected to the collector rings of armature A¹, cross current will flow between the two machines, speeding up armature A¹, until it is in synchronism with the current of increased frequency. The speeding up of armature A¹ requires power which is supplied by the frequency changer. The field of the direct-current motor may then be adjusted so that the power for maintaining this increased speed will be taken from the generator C. If the disk F³ is shifted so as to engage the disk G³ as shown in Fig. 1, or the reversing switch M³ and rheostat K³ are adjusted to rotate the motor I³, as shown in Fig. 2, that is, so that the rotatable member of frequency changer E³ is rotated forward, a frequency is produced in the stationary member slightly less than that of the current in the busses. Thus a current of decreased frequency is supplied to the collector rings of armature A³, which slows it down until it is in step with the current of decreased frequency. The field of this machine may then be adjusted also. The armatures A¹, A² and A³ will therefore run at slightly different speeds from one another, their speeds bearing a fixed relation to each other due to the synchronizing connections through the frequency changers, the revolving members of which are connected together to the same busses.

I desire it to be understood that my invention is not limited to the particular embodiments shown and described, and I aim in the appended claims to cover all modifications which do not depart from the spirit and scope of my invention.

What I claim as new and desire to secure by Letters Patent of the United States, is:—

1. In combination, a plurality of motors, a set of alternating-current busses, frequency changers connected in circuit between said busses and said motors, and means for driving said frequency changers from said motors at slightly different relative speeds.

2. In combination, a plurality of direct-current motors adapted to be driven at slightly different speeds and having alternating-current connections, a source of direct-current supplying said motors, a set of alternating-current busses, frequency changers connected between said busses and said motors, and means whereby said frequency changers may be driven at slightly different relative speeds.

3. In combination, a plurality of direct-current motors adapted to be driven at slightly different speeds and having alternating-current connections, a source of direct-current supplying said motors, a set of alternating-current busses, frequency changers connected between said busses and said motors, and means for driving said frequency changers from said direct-current motors at slightly different relative speeds.

4. In combination, a plurality of motors, a set of alternating-current busses, frequency changers connected in circuit between said busses and said motors, and variable speed mechanisms for driving said frequency changers from said motors either in a forward or a backward direction.

5. In combination, a plurality of direct-current motors adapted to be driven at slightly different speeds and having alternating-current connections, a source of direct-current supplying said motors, a set of alternating-current busses, frequency changers connected between said busses and said motors, and means whereby said frequency changers may be driven either in a forward or a backward direction.

6. In combination, a plurality of direct-current motors adapted to be driven at slightly different speeds and having alternating-current connections, a source of direct-current supplying said motors, a set of alternating-current busses, frequency changers connected between said busses and said motors, and variable speed mechanisms for driving said frequency changers from said motors either in a forward or a backward direction.

In witness whereof, I have hereunto set my hand this 21st day of June, 1909.

CHARLES C. BATCHELDER.

Witnesses:
BENJAMIN B. HULL,
HELEN ORFORD.